United States Patent [19]

Hatayama

[11] Patent Number: 4,635,947
[45] Date of Patent: Jan. 13, 1987

[54] UV-CURED AUTOMOTIVE SEAL COMPONENT

[75] Inventor: Satoyuki Hatayama, Toyoake, Japan
[73] Assignee: Tohkai Kogyo Co., Ltd., Aichi, Japan
[21] Appl. No.: 821,422
[22] Filed: Jan. 22, 1986
[30] Foreign Application Priority Data Jan. 24, 1985 [JP] Japan .................................. 60-11675

[51] Int. Cl.$^4$ ........................ F16J 15/10; F16J 15/14
[52] U.S. Cl. .................................. 277/235 A; 277/1; 296/93
[58] Field of Search ........... 277/1, 184, 235 R, 235 A, 277/237; 49/475; 296/93

[56] References Cited

U.S. PATENT DOCUMENTS

| | | | |
|---|---|---|---|
| 3,427,776 | 2/1969 | Lake et al. | 49/475 |
| 3,580,796 | 5/1971 | Hick et al. | 296/93 |
| 3,654,005 | 4/1972 | Higgins et al. | 296/93 |
| 3,659,896 | 5/1972 | Smith et al. | 296/93 |
| 3,970,322 | 7/1976 | Stecher et al. | 277/235 A |

FOREIGN PATENT DOCUMENTS 1929430 12/1970 Fed. Rep. of Germany ........ 49/475

*Primary Examiner*—Robert S. Ward
*Attorney, Agent, or Firm*—Howson and Howson

[57] ABSTRACT

The sliding contact surface of the main body of a seal component, such as an automotive weather strip or glass run, is provided with the lubricating coating formed from a UV-curing coating material, whereby the drawbacks of the prior art seals, such as the problems of useful life, sealing, whistling sound, sound insulation and manufacturing cost can be overcome.

2 Claims, 7 Drawing Figures

UV-CURED AUTOMOTIVE SEAL COMPONENT

FIELD OF THE INVENTION

The present invention relates to an automotive seal component such as a weather strip intended to be fitted to a window of an automobile.

DESCRIPTION OF THE PRIOR ART

As shown in FIG. 6, one form of automotive seal component is a weather strip 21 secured to a door panel 25. Either the weather strip includes bristles 24 set in its surface 23 as shown, or surface 23 is coated with a urethane coating material or the like at least on the portion of surface 23 which is brought into sliding contact with window glass 22. The bristles or coating ensure smooth opening and closing of the window glass 22. Another form of seal component is the glass run (not shown) at the top of the window opening. The glass run includes a flexible component which, like the weather strip of FIG. 6, is either provided with bristles, or with a coating of urethane or similar material.

A seal component provided with bristles has disadvantages in that the bristles have a short useful life due to abrasion or separation, the bristle space between the member and the window glass 22 generates a whistling sound, and secure sound insulation is not obtained. In addition, the manufacturing process of the member involves a primary and secondary step and is complicated as a whole, as shown in FIG. 7. The secondary step typically requires a curing treatment at 80° C. for 30 minutes, for example, resulting in high manufacturing cost.

A seal component coated with a urethane coating material has drawbacks in that high temperature heating (e.g. 150° C. for 10 minutes) is required for curing the coating material, leading to a high cost, and the high temperature heating may degrade the physical properties of the seal component.

SUMMARY OF THE INVENTION

According to the present invention, a main body of the automotive seal component member such as a weather strip is coated with a UV-curing (ultraviolet-curing) coating material at least on that portion of its surface which is brought into sliding contact with window glass, and the coating material is cured by irradiating with UV rays to provide a lubricating coating. When the sliding contact surface of the main body of the seal component member is brought into sliding contact with the window glass through the lubricating coating, the window glass can be opened and closed smoothly, excellent sealing, sound insulation and durability can be achieved, and whistling is avoided.

Accordingly, one object of the present invention is to enhance sealing, sound insulation and durability of a seal component brought into sliding contact with window glass.

Another object of the invention is to avoid the creation of whistling sounds produced by seals having bristles.

Another object of the invention is to simplify the manufacturing process of the seal component thereby lowering the manufacturing cost.

DETAILED DESCRIPTION

Figure 1:
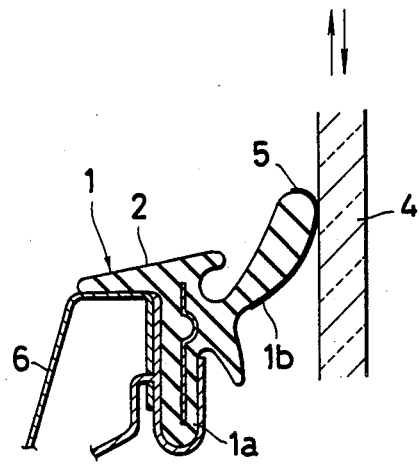
FIG. 1 is a cross-sectional view showing a weather strip in accordance with the invention in contact with a pane of automotive window glass.

In FIG. 1, numeral 1 denotes an automotive seal component comprising a weather strip 2 of natural or synthetic rubber. Numeral 1a denotes the main body of the weather strip, and numeral 1b denotes a sliding contact surface. Numeral 4 denotes a pane of automotive window glass, and numeral 5 denotes a lubricating coating on the sliding contact surface 16. The seal component 1 is fitted to a part of a door panel 6, and the sliding contact surface 1b is in elastic air and water-tight contact with window glass pane 4 through the coating 5.

Figure 2:
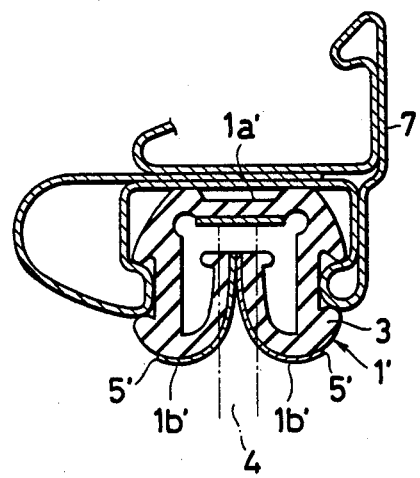
FIG. 2 is a cross-sectional view showing a glass run in accordance with the invention.

In FIG. 2, 1' denotes a seal component comprising a glass run 3 of natural or synthetic rubber including a main body 1a' and opposed sliding contact surfaces 1b' both having lubricating coatings 5'. The main body is secured to the door in a run channel 7, and glass pane 4 slides between and displaces the opposed sliding contact surfaces 1b'.

Figure 3:
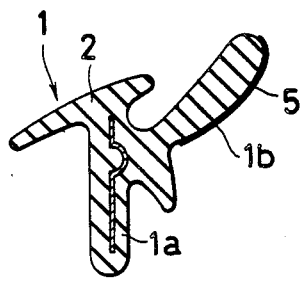
FIG. 3 shows a cross-sectional view of the weather strip of FIG. 1 alone.
Figure 6:
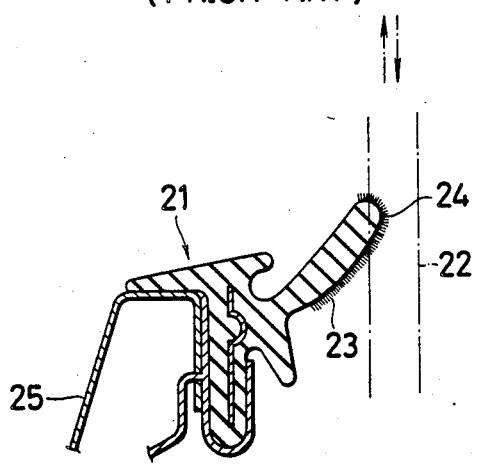
FIG. 6 is an explanatory view of the prior art.

FIG. 3 shows weather strip 2 of seal component 1. At least sliding contact surface 1b of main body 1a, that is the surface which comes into sliding contact with a liftable door window glass pane 4 or the like, is coated with a UV-curing coating material comprising an acrylic oligomer mixed with a reactive diluent, a photopolymerization initiator, a modifier or other similar additive, a dye and/or a pigment and the like. A preferred coating material is sold under the trademark "DIABEAM" by Mitsubishi Rayon Co. Ltd. The coating material is cured by irradiating with UV rays (supplied by a high pressure mercury vapor lamp, 80 W/cm) for 25 seconds to provide the lubricating coating 5. The thickness of the coating is preferably in the range from about 0.005 to 0.020 mm.

Acrylic oligomer is an acrylic resin having two or more acryloyl groups ($-OOC-CH=CH_2$) in molecule, with relatively low molecular weight, which is fluidic at room temperature, modified by urethane, epoxy, polyester, polyether, silicone, etc. This is a fundamental element of the coating and there are a lot of examples which may differ in chemical composition, molecular structure, molecular weight, etc.

Reactive diluent is monofunctional monomer and/or polyfunctional monomer used principally to improve coating workability, which also functions to adjust degree of curing and cross-linking. Moreover, conventional organic diluents may be simultaneously used with a view to lowering viscosity or improving wettig with substrates, if necessary.

Photopolymerization initiator is a compound which absorbs UV rays having wavelengths between 200 m$\mu$ and 420 mμ which generates radicals and triggers polimerization/curing reaction.

Modifier or additive is utilized to improve adhesion, surface condition or stability of coating.

The coating 5 has appropriate hardness and flexibility as well as high chemical resistance, and shows excellent performance in abrasion resistance, flexing resistance and dynamic coefficient of friction.

As shown in FIGS. 1 and 2, a seal component according to the invention may be fitted to the door panel 6 or the run channel 7 of an automobile so that the UV-cured coating is in elastic sliding contact with the liftable window glass pane 4 without leaving any gap therebetween. Accordingly, generation of whistling sounds is prevented, and superior sealing, sound insulation and durability are achieved. In addition, the window glass can be opened and closed smoothly because of the low slide resistance of the seal component relative to the glass.

Figure 4:
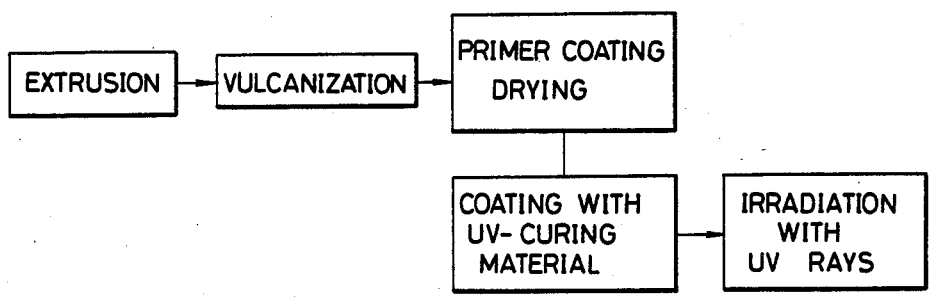
FIGS. 4 and 5 are schematic flow charts of two alternative manufacturing processes of the seal component according to the invention.
Figure 5:
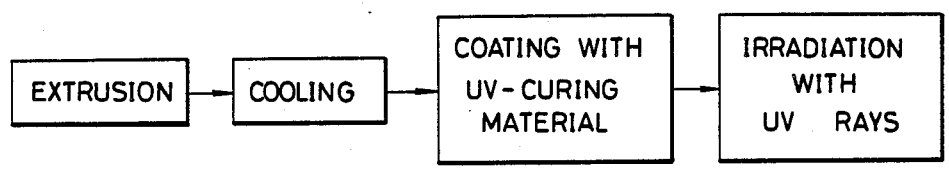
Figure 7:
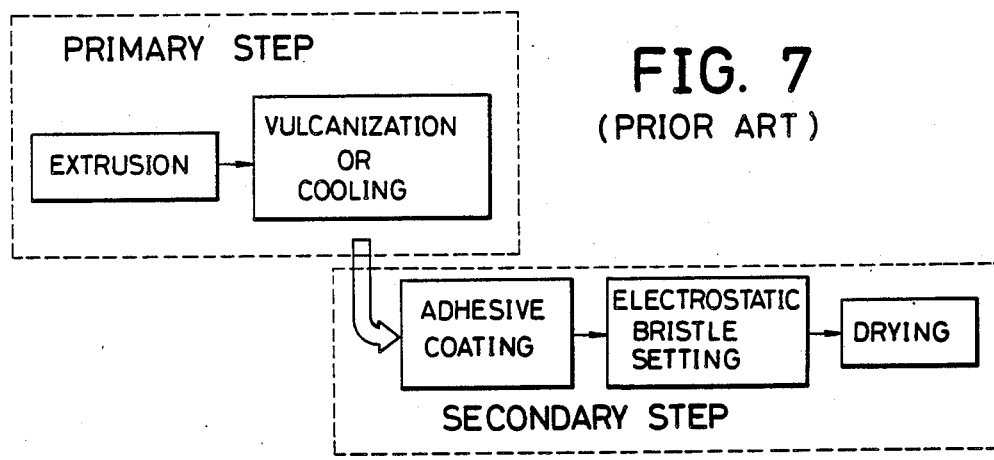
FIG. 7 is a flow chart of a conventional manufacturing process of a seal component member.

FIGS. 4 and 5 are schematic flow charts of the manufacturing processes of the seal component member, FIG. 4 showing the case in which the material for the member is a rubber, and FIG. 5 showing the case in which the material is a vinyl chloride resin. These processes are simple, the cost of equipment is low and the period of time required for the treatments is a relatively small number of seconds, with the result of enhanced productivity. It has been found that in the UV ray irradiation step, the coating 5 is cured at a low temperature and in a short time, the curing requires little energy, and the thermal effect on the seal component is very small. The equipment for the coating step and the equipment for the irradiation step are united together and simplified. The seal component can be manufactured at low cost owing to the above-mentioned merits.

According to the invention, the sliding contact surface 1b of the main body 1a of the seal component 1 is provided with a lubricating coating 5 formed from a UV-curing coating material, whereby the drawbacks of the prior art seals, such as the problems of useful life, sealing, whistling sound, sound insulation and manufacturing cost can be overcome altogether. Thus, the seal component according to the invention is of considerable practical value.

I claim:

1. A seal component, for providing a sliding seal against a pane of window glass, comprising a main body provided with a lubricating coating on at least the surface thereof brought into sliding contact with the window glass, said coating formed by coating said surface with a UV-curing coating material followed by irradiating said coating material with UV rays.

2. A seal component according to claim 1, wherein said coating material comprises an acrylic oligomer mixed with a reactive diluent, a photopolymerization initiator, a modifier or other similar additive, and a dye and/or a pigment.

* * * * *